United States Patent [19]

Itoh et al.

[11] 4,429,071

[45] Jan. 31, 1984

[54] VINYL CHLORIDE PLASTISOL COMPOSITIONS

[75] Inventors: Shojiro Itoh; Masayuki Murashige; Toshio Igarashi, all of Niihama, Japan

[73] Assignee: Sumitomo Chemical Company, Limited, Osaka, Japan

[21] Appl. No.: 270,065

[22] Filed: Jun. 3, 1981

[30] Foreign Application Priority Data

Jun. 12, 1980 [JP] Japan ................. 55-79649

[51] Int. Cl.$^3$ .............................................. C08L 27/00
[52] U.S. Cl. ................... 524/569; 524/296; 524/297
[58] Field of Search ............ 260/31.8 R; 524/296, 524/297, 569

[56] References Cited

U.S. PATENT DOCUMENTS

| | | | |
|---|---|---|---|
| 2,580,290 | 12/1951 | Fawcett et al. | 524/569 |
| 3,328,334 | 6/1967 | Fuchsman | 524/569 |
| 3,701,747 | 10/1972 | Osmond et al. | 260/31.8 R |
| 3,725,325 | 4/1973 | Takeda et al. | 260/31.8 R |
| 3,795,649 | 3/1974 | May | 260/31.8 R |

FOREIGN PATENT DOCUMENTS 2009772 6/1979 United Kingdom .

*Primary Examiner*—Joseph L. Schofer
*Assistant Examiner*—N. Sarofim
*Attorney, Agent, or Firm*—Karl W. Flocks; Sheridan Neimark

[57] ABSTRACT

A vinyl chloride plastisol composition comprises 100 parts by weight of a vinyl chloride paste resin and 35 to 180 parts by weight of a plasticizer the vinyl chloride paste resin having an average particle size of 0.5 to 10 microns, and being composed of 5 to 80% by weight of tetrahydrofuran-insoluble micro-gel fraction and 20 to 95% by weight of tetrahydrofuran-soluble fraction.

7 Claims, No Drawings

VINYL CHLORIDE PLASTISOL COMPOSITIONS

The present invention relates to a vinyl chloride plastisol composition comprising a vinyl chloride paste resin containing a micro-gel fraction insoluble in tetrahydrofuran (hereinafter referred to as THF) and a plasticizer.

A vinyl chloride plastisol composition is a high-concentration solid-in-liquid dispersion type composition produced by dispersing a vinyl chloride paste resin of 0.1 to 10 microns in particle size in a liquid-form plasticizer scarcely dissolving the paste resin at room temperature, and if necessary, adding stabilizers, vinyl chloride extender resins, fillers, and pigments.

The vinyl chloride plastisol compositions produce articles having a suitable flexibility, excellent weather resistance and chemical resistance, so that they have been used in various fields such as floor coverings, wall coverings, leathers-clothes, dolls, balls, coatings for steel plates and the like. Recently, its demand has increased to a large extent, and its use is particularly remarkable in the fields of floor coverings and wall coverings. For producing floor coverings and wall coverings, the following method is generally employed: A vinyl chloride plastisol containing a blowing agent is coated on asbestos paper; after the plastisol has been gelled, a vinyl chloride plastisol containing no blowing agent is coated thereon in order to form a transparent surface layer; and the assembly is heated. For applying embossed patterns on the surface, the assemblies are passed through embossing rolls (mechanical embossing), or printing ink containing an anti-blowing agent (e.g. trimellitic acid anhydride) is coated on the foregoing gelled, blowing agent-containing vinyl chloride plastisol layer (chemical embossing).

For the vinyl chloride plastisol containing no blowing agent used to produce transparent surface layer, the following properteies are required:

(1) The plastisol should have low viscosity and good viscosity stability.

(2) The surface layer should have excellent heat distortion resistance (cigarette resistance).

(3) The surface layer should have excellent transparency.

(4) The surface layer should have excellent abrasion resistance.

(5) The edge of embossed patterns formed by embossing rolls should be sharp [edge formability on embossing (referred to simply as "edge formability" hereinafter) should be good].

For satisfying these requirements, the following methods were proposed: A method using vinyl chloride plastisol compositions containing a reactive plasticizer for improvements in heat distortion and abrasion resistance [Japanese Patent Application Kokai (Laid-open) No. 88582/1976]; and a method using vinyl chloride plastisol compositions containing a dithioltriazine as crosslinking agent (ibid., No. 21052/1977) or vinyl chloride plastisol compositions containing trithiocyanuric acid and a crosslinking-promoting agent (ibid., No. 11950/1978) for improvements in heat distortion resistance and transparency.

In the method using a vinyl chloride plastisol composition containing a reactive plasticizer, improvements in heat distortion resistance can be little expected because the vinyl chloride polymer hardly suffers substantial modification. In the method using a vinyl chloride plastisol composition containing a crosslinking agent and a crosslinking-promoting agent, heat distortion resistance is imporved, but there are also many drawbacks: The crosslinking agent has an odor all its own; application conditions are largely limited because of an increase in the viscosity of the vinyl chloride plastisol and a necessity to sufficiently advance crosslinking on heating; and articles obtained are poor in transparency and water resistance. Consequently, these methods are not satisfactory.

The inventors extensively studied to obtain vinyl chloride plastisol compositions which can easily be applied to floor coverings and wall coverings, producing a surface layer on the materials markedly improved in heat distortion resistance (cigarette resistance), edge formability and abrasion resistance without lowering in transparency and water resistance. As a result, it was found that all the above requirements can be satisfied by using a vinyl chloride paste resin containing a THF-insoluble micro-gel fraction, and besides that the viscosity stability of vinyl chloride plastisol is improved to a large extent since a fraction of the vinyl chloride paste resin is prevented from swelling caused by plasticizers.

Emulsion polymerization of a vinyl chloride monomer in the presence of a polyfunctional monomer having two or more ethylenic double-bonds is well known in several references. But the purpose of these references is a mere alteration in average degree of polymerization (Japanese Patent Publication Nos. 13985/1968 and 6630/1971), improvements in melt flowability and processability on general processing of plasticized or rigid vinyl chloride resins such as extrusion molding and injection molding (ibid., Nos. 17091/1961, 1494/1963 and 45422/1972) and delustering [Japanese Patent Application Kokai (Laid-open) No. 163939/1971]. In any case, no careful consideration is given at all to use as vinyl chloride plastisol compositions. For the purpose of using vinyl chloride resins as plastisol compositions, the average particle size of the resins should be limited to within a range of 0.5 to $10\mu$ by processing conditions. But, the above well-known literature make no reference at all to the production of vinyl chloride resins having a particle size within such range.

An object of the present invention is to provide a vinyl chloride plastisol composition having a good viscosity stability.

Another object of the present invention is to provide a vinyl chloride plastisol composition capable of being used for producing articles having greatly improved heat distortion resistance (cigarette resistance), abrasion resistance and edge formability as well as creep resistance under elevated high-temperature and bounce impact elasticity with excellent transparency and water resistance retained.

According to the present invention, there is provided a vinyl chloride plastisol composition comprising 100 parts by weight of a vinyl chloride paste resin and 35 to 180 parts by weight of a plasticizer, said vinyl chloride paste resin having an average particle size of 0.5 to 10 microns, and being composed of 5 to 80% by weight of THF-insoluble-micro-gel fraction and 20 to 95% by weight of THF-soluble fraction. The term "THF-insoluble micro-gel fraction" used herein means a gel fraction equivalent to that produced as follows: The vinyl chloride paste resin is dissolved in THF of 40° C. for 22 hours, and a gel fraction is then separated on a high-speed centrifuge by applying a centrifugal force of 10,000 G for 60 minutes.

The term "average particle size" used herein means a volume-surface average particle size measured by an electron microscopic observation.

For the vinyl chloride paste resin used in the present invention, it is essential that the content of the THF-insoluble micro-gel fraction be 5 to 80% by weight, preferably 8 to 50% by weight, and that the average particle size is 0.5 to 10μ. When the content is less than 5% by weight, effects to improve the viscosity stability of the vinyl chloride plastisol and the heat distortion resistance (cigarette resistance) and abrasion resistance of end products become insufficient, and also edge formability becomes poor. While, when the content exceeds 80% by weight, the end products become poor in transparency.

When the average particle size is less than 0.5μ, the vinyl chloride plastisol composition increases in viscosity and lowers in viscosity stability, becoming difficult in application, and besides it is impossible to improve the edge formability, heat distortion resistance (cigarette resistance) and abrasion resistance of end products. When the average particle size is more than 10μ, pasting becomes difficult and also the transparency of formed products extremely lowers.

The vinyl chloride paste resin, its average particle size being 0.5 to 10μ and content of THF-insoluble micro-gel fraction being 5 to 80% by weight, used in the present invention is produced by emulsion polymerization or micro-suspension polymerization of vinyl chloride or a mixture of a major amount of vinyl chloride with a minor amount of a monomer copolymerizable therewith in the presence of a polyfunctional monomer having two or more ethylenic double-bonds.

As the monomer copolymerizable with vinyl chloride, there are given for example; olefins such as ethylene, propylene and butene; fatty acid vinyl esters such as vinyl acetate, vinyl propionate, vinyl laurate and vinyl stearate; unsaturated acids such as acrylic acid, methacrylic acid and itaconic acid; alkyl vinyl ethers such as methyl vinyl ether, ethyl vinyl ether and octyl vinyl ether; alkyl acrylates such as methyl acrylate, ethyl acrylate, butyl acrylate and 2-ethylhexyl acrylate; alkyl methacrylates such as methyl methacrylate; unsaturated nitriles such as acrylonitrile; unsaturated amides such as acrylamide; vinylidene halides such as vinylidene chloride.

These monomers are used preferably in the amount of not more than 30% by weight, more preferably not more than 10% by weight of the total monomers. As the polyfunctional monomer having two or more ethylenic double-bonds used for forming THF-insoluble micro-gels, there are given for example diallyl phthalates (e.g. diallyl phthalate, diallyl isophthalate, diallyl terephthalate), diallyl esters of ethylenically unsaturated dibasic acid (e.g. diallyl maleate, diallyl fumarate, diallyl itaconate), diallyl esters of saturated dibasic acid (e.g. diallyl adipate, diallyl acetate, diallyl sebacate), divinyl ethers (e.g. ethylene glycol divinyl ether, n-butanediol divinyl ether, octadecane divinyl ether), diallyl ethers (e.g. diallyl ether, ethyleneglycol diallyl ether), triallyl cyanurate, triallyl isocyanurate, triallyl trimellitate, dimethacrylic esters or diacrylic esters of polyhydric alcohol (e.g. ethylene glycol dimethacrylate, triethylene glycol dimethacrylate, dimethylene glycol diacrylate, triethylene glycol diacrylate), trimethacrylic esters or triacrylic esters of polyhydric alcohol (e.g. trimethylolpropane trimethacrylate, trimethylolpropane triacrylate, trimethylolethane trimethacrylate, trimethylolethane triacrylate, tetramethylolmethane triacrylate), bis(methacryloyloxyethylene)phthalate and 1,3,5-triacryloylhexahydrotriazine. These polyfunctional monomers may be used alone or in combination. The amount of the polyfunctional monomer added to the polymerization system can not absolutely be decided, since the kind of the monomr and the polymerization temperature change the content of the THF-insoluble micro-gel fraction. To use too large amounts makes the content of the micro-gel fraction larger than 80% by weight and also it is disadvantageous economically. Too small amounts make the content smaller than 5% by weight. Consequently, the amount of the monomer is generally considered to be within a range of 0.01 to 5% by weight, preferably 0.05 to 1% by weight of the total monomers. The polymerization temperature is generally 20° to 60° C., preferably 30° to 55° C. The average degree of polymerization of the THF-soluble fraction in vinyl chloride paste resins obtained by polymerization is not particularly limited, but generally it is more than 800, preferably more than 1100.

The vinyl chloride paste resin having average particle size of 0.5 to 10μ and content of THF-insoluble micro-gel fraction of 5 to 80% by weight, used in the present invention is produced by emulsion polymerization or micro-suspension polymerization, particularly suitably by seed emulsion polymerization. As the catalyst used for emulsion polymerization, there are given for example water-soluble radical initiators (e.g. hydrogen peroxide, potassium persulfate) and redox catalysts comprising the initiators and organic or inorganic reducing agents (e.g. l-ascorbic acid, Rongalit, sodium thiosulfate, sodium sulfite). As the catalyst used for micro-suspension polymerization, oil-soluble radical initiators such as lauroyl peroxide, isopropyl peroxydicarbonate, etc. are used.

As the emulsifier, anionic emulsifiers such as alkylbenzenesulfonates, alkylsulfonates, alkyl sulfates, fatty acid metallic salts, alkylsulfosuccinates, etc. are used. As the dispensing agents used together with the emulsifier in micro-suspension polymerization, higher alcohols, higher fatty acids, chlorinated paraffins, etc. are preferably used.

The vinyl chloride latex obtained by emulsion polymerization or micro-suspension polymerization is generally spray-dried, and used as the gel-containing vinyl chloride paste resin, a starting material of the present invention.

In the present invention, the vinyl chloride paste resin may constitute a mixture of the vinyl chloride paste resin containing THF-insoluble micro-gel fraction and a vinyl chloride paste resin containing no THF-insoluble micro-gel and having an average particle size of 0.5 to 10μ, so long as the content of said THF-insoluble micro-gel fraction is kept within the range as defined above.

The vinyl chloride paste resin containing no THF-insoluble micro-gel can be produced by a conventional emulsion or micro-suspension polymerization technique. In other words, the vinyl chloride paste resin of micro-gel free can be easily produced in the substantially same manner as in production of the vinyl chloride paste resin containing THF-insoluble micro-gel except using no polyfunctional monomer.

In the vinyl chloride plastisol composition of the present invention, the amount of a plasticizer used is 35 to 180 parts by weight, preferably 50 to 100 parts by weight based on 100 parts by weight of the vinyl chloride paste resin. Contents more than 180 parts by weight lower the heat distortion resistance (cigarette resistance), abrasion resistance and edge formability on embossing of end product. When the content is less than 35 parts by weight, the vinyl chloride plastisol shows a rapid increase in viscosity, particularly in dilatancy on high shear rate, becoming difficult in application, and besides end products become so rigid that flexibility peculiar to the articles produced by plastisol is damaged.

As the plasticizer used in the vinyl chloride plastisol compositions, there are given for example well-known plasticizers such as dialkyl phthalates (e.g. dioctyl phthalate, octyl decyl phthalate), alkylphthalyl alkyl glycolates (e.g. ethylphthalyl ethyl glycolate, butylphthalyl butyl glycolate), dialkyl alkanedicarboxylates (e.g. diisobutyl adipate, dibutyl sebacate), acetyltrialkyl or trialkyl citrates (e.g. acetyltributyl citrate, tributyl citrate) and trialkyl or triallyl phosphites (e.g. trioctyl phosphite, tricresyl phosphite).

The vinyl chloride plastisol composition of the present invention may contain, if necessary, stabilizers, diluents, vinyl chloride extender resins and the like well known to the art. The stabilizer is used to prevent discoloration, and its amount used is about 10 parts by weight or less based on 100 parts by weight of the vinyl chloride paste resin. The stabilizer includes for example a barium, zinc, cadmium, lead, tin or calcium salt of fatty acid.

The diluent is used to reduce viscosity, and it is used in amounts of, generally, about 15 parts by weight or less based on 100 parts by weight of the vinyl chloride paste resin so that the surface state of end products may be kept good and the heat distortion resistance (cigarette resistance) thereof may not be damaged. The diluent includes for example paraffinic hydrocarbons, naphthenic hydrocarbons, aromatic hydrocarbons and terpenes.

The vinyl chloride extender resin is used to decrease dilatancy at high shear rate, and its amount used is generally about 70 parts by weight or less based on 100 parts by weight of the vinyl chloride paste resin. As such resin, vinyl chloride resins of more than $20\mu$ in diameter produced by suspension polymerization or bulk polymerization are used.

The vinyl chloride plastisol compositions of the present invention as described in detail makes it possible to improve heat distortion resistance (cigarette resistance), abrasion resistance and edge formability without lowering transparency and water resistance. Further, the compositions enable the above improvements to be carried out not by the troublesome means such as post-crosslinking, but by the well-known means, and also they themselves have an improved viscosity stability. The compositions of the present invention are used as not only floor coverings and wall coverings but also leather-clothes, dolls, balls, coatings for steel plates, etc. having good heat distortion resistance, by coating, slush molding, rotational molding, cast molding, dipping or the like, followed by gelation, melting and cooling.

Further, in the present invention the vinyl chloride paste resin can be produced very easily and economically with a commercial advantage.

Next, the present invention will be illustrated in detail with reference to the following examples, but not limited thereto.

The physical properties in the examples were measured by the following test methods:

(1) Viscosity of vinyl chloride plastisol composition.

Vinyl chloride paste resin is added to plasticizer and properly mixed therewith in a specified atmospheric condition (25° C., 60% RH) and stored in the same atmosphere for 2 hours to 7 days (168 hours). Thereafter, the viscosity of the resulting plasticol is measured on BL viscometer (produced by Tokyo Keiki Co.) in the same condition with rotor No. 4 rotated at 6 rpm.

(2) Heat distortion resistance (cigarette resistance).

Heat distortion resistance is judged by the degree of burning on the surface layer of a test piece when the test piece is heated for 40 seconds by a microheater (7 V) 3 mm apart therefrom.

o: No burning
 Δ: Slight burning
 x: Considerable burning or slight melting of the surface of such degree as to cause deformation. Commercial value is markedly low.

(3) Wear resistance.

Test is carried out on Taber rotary abraser using a test piece cut out of an end product, and abrasion resistance is expressed in abrasion loss obtained under the conditions: Abrasive wheel, CS-17; weight, 1000 g; and the number of rotations, 3000. The smaller the test value the better.

(4) Transparency.

Transparency is judged by the degree of clearness of printed pattern on the foamed layer of an end product.

o: Very clear pattern
 Δ: Slightly unclear pattern
 x: Considerably unclear pattern Commercial value is markedly low.

(5) Edge formability on embossing.

A test piece is passed through embossing rolls, heated to 170° C. at the surface, at a linear speed of 20 m/min to apply embossed patterns on the surface layer. Edge formability is judged by the degree of sharpness of the edge of the embossed patterns.

o: Sharp edge
 Δ: Slightly dull edge
 x: Considerably dull edge Commercial value is markedly low.

EXAMPLES 1–7

To a 100-liter autoclave equipped with a stirrer were added deionized water (35 liters), 300 g (converted to solid basis) of a vinyl chloride seed latex (solid content; 34 wt. %, average particle size; $0.2\mu$) and diallyl phthalate of the amount shown in Table 1. After replacing the atmosphere in the autoclave by nitrogen, a vinyl chloride monomer (30 kg) was added. After raising the temperature to the one shown in Table 1 with stirring, polymerization was carried out in such a way that: A redox catalyst, hydrogen peroxide/formaldehyde sodium sulfoxylate was continuously added at a rate of 0.0026 wt. % per hour based on the vinyl chloride monomer from the initial stage of polymerization; and an emulsifier, sodium lauryl sulfate, was continuously added at a rate of 0.05 wt. % per hour based on the vinyl chloride monomer from 1 hour after the beginning of polymerization. Polymerization was stopped at the time when the inner pressure dropped by 1 kg/cm². The vinyl chloride latex obtained was spray-dried to obtain a vinyl chloride paste resin. The paste resin was measured for average particle size, gel content and average degree of polymerization of the THF-soluble fraction. The results are shown in Table 1.

To the vinyl chloride paste resin thus obtained (100 parts by weight) were added 60 parts by weight of di-2-ethylhexyl phthalate as a plasticizer, and 2 parts by weight of a stabilizer (KR-69B-1, a trade name, produced by Kyodo Yakuhin Co.), and was admixed in a planetary mixer and degassed to prepare a vinyl chloride plastisol. The viscosity of this plastisol after 2 hours and 7 days is shown in Table 1. This plastisol was coated to 0.5 mm thickness on formable plastisol layer. Said foamable plastisol layer was previously coated on nonflammable asbestos paper, gelled and printed with patterns at the surface. The assembly was heated to 200° C. for 2 minutes to obtain an end product. A test piece was prepared from the product and measured for heat distortion resistance (cigarette resistance), abrasion resistance, transparency and edge formability on embossing. The results are shown in Table 1.

and then diallyl phthalate (120 g) was added. After replacing the atmosphere in the autoclave by nitrogen, a vinyl chloride monomer (30 kg) was added. The temperature was raised to 50° C. with stirring, and polymerization was carried out by continuously adding (or without adding) an emulsifier of the kind and amount shown in Table 2 from 1 hour after the beginning of polymerization. Polymerization was stopped at the time when the inner pressure dropped by 1 kg/cm². The vinyl chloride latex or slurry obtained was dried to obtain vinyl chloride resin. The resin was measured for average particle size, gel content and average degree of polymerization of the THF-soluble fraction. The results obtained are shown in Table 3.

To the vinyl chloride paste resin thus obtained (100 parts by weight) were added di-2-ethylhexyl phthalate as a plasticizer of the amount shown in Table 3 and 2 parts by weight of a stabilizer (KR-69B-1, a trade name, produced by Kyodo Yakuhin Co.), and was admixed in

TABLE 1

| | Polymerization condition | | Vinyl chloride paste resin | | |
|---|---|---|---|---|---|
| Exp. No. | Diallyl phthalate (g) | Polymerization temperature (°C.) | Average particles size (μ) | Gel content (wt. %) | Average degree of polymerization of THF-soluble fraction |
| 1 (Comparative example) | 0 | 50 | 0.98 | 0 | 1620 |
| 2 (Comparative example) | 30 | 50 | 0.96 | 3 | 2480 |
| 3 | 60 | 50 | 0.95 | 6 | 2520 |
| 4 | 120 | 50 | 0.98 | 32 | 1440 |
| 5 | 180 | 50 | 0.94 | 67 | 1200 |
| 6 | 60 | 40 | 0.92 | 8 | 3010 |
| 7 (Comparative example) | 300 | 50 | 0.89 | 89 | 730 |

| Vinyl chloride plastisol | | Physical property of end product | | | |
|---|---|---|---|---|---|
| Viscosity 2 hours after preparation (poise) | Viscosity 7 days after preparation (poise) | Heat distortion resistance (cigarette resistance) | Abrasion resistance (mg) | Transparency | Edge formability on embossing |
| 28 | 64 | x | 34 | o | x |
| 29 | 60 | x | 29 | o | x |
| 28 | 52 | Δ | 23 | o | Δ |
| 26 | 47 | o | 13 | o | o |
| 28 | 45 | o | 20 | o-Δ | o |
| 27 | 50 | o | 12 | o | o |
| 32 | 48 | o | 28 | x | o |

Table 1 clearly shows that the vinyl chloride plastisol compositions of the present invention, using a vinyl chloride paste resin of which the gel content is 5 to 80 wt. %, have excellent viscosity stability and also easily produce end products excellent in heat distortion resistance (cigarette resistance), abrasion resistance, transparency and edge formability on embossing.

EXAMPLES 8-14

To a 100-liter autoclave equipped with a stirrer were added deionized water, vinyl chloride seed latex (average particle size, 0.2μ), catalyst, emulsifier, dispersing agent and (or) suspending agent, as shown in Table 2, a planetary mixer and degassed to prepare a vinyl chloride plastisol. The viscosity of this plastisol after 2 hours and 7 days is shown in Table 3. This plastisol was coated to 0.5 mm thickness on foamable plastisol layer. Said foamable plastisol layer was previously coated on nonflammable asbestos paper, gelled and printed with patterns at the surface. The assembly was heated to 200° C. for 2 minutes to obtain a end product. A test piece was prepared from the product and measured for heat distortion resistance (cigarette resistance), abrasion resistance, transparency and edge formability on embossing. The results obtained are shown in Table 3.

TABLE 2

| Polymerization conditions | | | |
|---|---|---|---|
| Ion exchange water | Seed latex (g, converted to solid) | Catalyst | Emulsifier added at the initial |

TABLE 2-continued

| Exp. No. | (liter) | basis) | (g) | | stage (g) | |
|---|---|---|---|---|---|---|
| 8 (Comparative example) | 35 | — | Potassium persulfate | 45 | Sodium lauryl sulfate | 30 |
| 9 (Comparative example) | 30 | 4500 | Potassium persulfate | 15 | — | |
| 10 | 35 | 600 | Potassium persulfate | 24 | — | |
| 11 | 38 | — | Isopropyl peroxydicarbonate | 9 | Sodium dodecylbenzene-sulfonate | 180 |
| 12 | 35 | 150 | Potassium persulfate | 30 | — | |
| 13 (Comparative example) | 45 | — | Diisobutyl peroxydicarbonate | 15 | — | |
| 14 (Comparative example) | 45 | — | Diisobutyl peroxydicarbonate | 15 | — | |

| Dispersing agent (g) | Suspending agent (g) | Emulsifier continuously added (g/hour) | | Homogenization by homogenizer |
|---|---|---|---|---|
| — | — | Sodium lauryl sulfate | 15 | — |
| — | — | Sodium lauryl sulfate | 15 | — |
| — | — | Sodium lauryl sulfate | 15 | — |
| Cetyl alcohol 150 | — | — | | One hour's homogenization by homogenizer before temperature-rise |
| — | — | Sodium dodecyl-benzenesulfonate | 15 | — |
| — | Partially saponified polyvinyl alcohol 60 | — | | — |
| — | Partially saponified polyvinyl alcohol 60 | — | | — |

TABLE 3

| | Vinyl chloride resin | | | | Plasticizer Di-2-ethylhexyl phthalate (part by weight) |
|---|---|---|---|---|---|
| Exp. No. | Average particle size (μ) | Gel content (wt. %) | Average degree of polymerization of THF-soluble fraction | | |
| 8 (Comparative example) | 0.11 | 2 | 1400 | | 80 |
| 9 (Comparative example) | 0.39 | 10 | 1450 | | 60 |
| 10 | 0.74 | 28 | 1420 | | 60 |
| 11 | 0.92 | 31 | 1480 | | 60 |
| 12 | 1.38 | 35 | 1420 | | 60 |
| 13 (Comparative example) | 60 | 44 | 1490 | | 60 |
| 14 (Comparative example) | 60 | 44 | 1490 | | 100 |

| Vinyl chloride plastisol | | Physical property of end product | | | |
|---|---|---|---|---|---|
| Viscosity 2 hours after preparation (poise) | Viscosity 7 days after preparation (poise) | Heat distortion resistance (cigarette resistance) | Abrasion resistance (mg) | Transparency | Edge formability on embossing |
| 262 | >1000 | x | 33 | o | x |
| 435 | >1000 | x | 28 | o | x |
| 45 | 88 | o | 19 | o | o |
| 27 | 45 | o | 17 | o | o |
| 23 | 38 | o | 15 | o | o |
| Pasting is impossible | — | — | — | — | — |
| 72 | Immeasurable owing to sedimentation | o | 16 | x | o |

TABLE 3-continued of particles

The followings are clearly shown from Table 3: When the average particle size is smaller than 0.5μ, even if the gel content is within the range as defined in the present invention, both the viscosity stability of the plastisol and the heat distortion resistance, abrasion resistance and edge formability on embossing of the end product become poor (Exp. No. 9); and when the average particle size is larger than 10μ, it becomes difficult to obtained a plastisol and the transparency of the end products becomes poor (Exp. Nos. 13 and 14). Further, the table clearly shows that the vinyl chloride plastisol compositions of the present invention, using a vinyl chloride paste resin containing gels and having an average particle size of 0.5 to 10μ, have excellent viscosity stability and also easily produce end products excellent in heat distortion resistance (cigarette resistance), abrasion resistance, transparency and edge formability on embossing.

EXAMPLE 15-20

To the vinyl chloride paste resin (100 parts by weight) obtained in Experiment No. 4 of Example 1 were added a plasticizer of the kind and amount shown in Table 4 and 2 parts by weight of a stabilizer (KR-69B-1, a trade name, produced by Kyodo Yakuhin Co.), and was admixed in a planetary mixer, and degassed to prepare a vinyl chloride plastisol. The viscosity of the plastisol after 2 hours and 7 days is shown in Table 4.

This plastisol was coated to 0.5 mm thickness on foamable plastisol layer. Said foamable plastisol layer was previously coated on non-flammable asbestos paper, gelled and printed with patterns at the surface. The assembly was heated to 200° C. for 2 minutes to obtain a end product. A test piece was prepared from the product and measured for heat distortion resistance (cigarette resistance), abrasion resistance, transparency and edge formability on embossing. The results are shown in Table 4.

TABLE 4

| | Plasticizer | | Vinyl chloride plastisol | |
|---|---|---|---|---|
| | | | Viscosity | Viscosity |
| | Di-2-ethylhexyl phthalate (part by weight) | Dibutyl phthalate (part by weight) | 2 hours after preparation (poise) | 7 days after preparation (poise) |
| Exp. No. | | | | |
| 15 (Comparative example) | 30 | — | >1000 | >1000 |
| 16 | 40 | — | 177 | 384 |
| 17 | 70 | — | 19 | 24 |
| 18 | 50 | 50 | 8.5*1 | 15.2*1 |
| 19 | 150 | — | 4.5*2 | 5.2*2 |
| 20 (Comparative example) | 200 | — | 2.9*2 | 3.0*2 |

| Physical property of end product | | | | |
|---|---|---|---|---|
| Heat distortion resistance (cigarette resistance) | Abrasion resistance (mg) | Transparency | Edge formability on embossing | Remarks |
| o | 21 | x | o | Coating was difficult End product has too hard feeling. |
| o | 14 | o-Δ | o | |
| o | 16 | o | o | |
| o | 19 | o | o | |
| o | 23 | o | o-Δ | |
| x | 38 | o | x | End product has too soft feeling. |

*1Measured at 6 rpm using Rotor No. 2 on BL viscometer.
*2Measured at 6 rpm using Rotor No. 1 on BL viscometer.

Table 4 clearly shows that the vinyl chloride plastisol composition, obtained by the method of the present invention using a gel-containing vinyl chloride paste resin (100 parts by weight) and a plasticizer (35 to 180 parts by weight), have excellent viscosity stability and also easily produce end products excellent in heat distortion resistance (cigarette resistance), abrasion resistance, transparency and edge formability on embossing.

EXAMPLES 21-25

To a 100-liter autoclave equipped with a stirrer were added deionized water (35 liters), 300 g (converted to solid basis) of a vinyl chloride seed latex (the solid content; 34 wt. %, average particles size; 0.2μ) and a polyfunctional monomer of the kind and amount shown in Table 5. After replacing the atmosphere in the autoclave by nitrogen, a vinyl chloride monomer (30 kg) was added. After raising the temperature to 50° C. with stirring, polymerization was carried out in such a way that: A redox catalyst, hydrogen peroxide/formaldehyde sodium sulfoxylate, was continuously added at a rate of 0.0026 wt. % per hour based on the vinyl chloride monomer from the initial stage of polymerization; and an emulsifier, sodium lauryl sulfate, was continuously added at a rate of 0.05 wt. % per hour based on the vinyl chloride monomer from 1 hour after the beginning of polymerization. Polymerization was stopped at the time when the inner pressure dropped by 1 kg/cm².

The vinyl chloride latex obtained was spray-dried to obtain a vinyl chloride paste resin. The paste resin was measured for average particle size, gel content and average degree of polymerization of the THF-soluble fraction. The results obtained are shown in Table 5.

To the vinyl chloride paste resin thus obtained (100 parts by weight) were added 60 parts by weight of di-2-ethylhexyl phthalate, a plasticizer, and 2 parts by weight of a stabilizer (KR-69B-1, a trade name, produced by Kyodo Yakuhin Co.), and was admixed in a planetary mixer and degassed to prepare a vinyl chloride plastisol. The viscosity of this plastisol after 2 hours and 7 days is shown in Table 5.

This plastisol was coated to 0.5 mm thickness on foamable plastisol layer. Said foamable plastisol layer was previously coated on non-flammable asbestos paper, gelled and printed with patterns at the surface. The assembly was heated to 200° C. for 2 minutes to obtain an end product. A test piece was prepared from the product and measured for heat distortion resistance (cigarette resistance), abrasion resistance, transparency and edge formability on embossing. The results obtained are shown in Table 5.

TABLE 5

| | | | Vinyl chloride paste resin | | |
|---|---|---|---|---|---|
| Exp. No. | Polymerization | Dosage of polyfunctional monomer (g) | Average particle size (μ) | Gel content (wt. %) | Average degree of polymerization of THF-soluble fraction |
| 21 | Diallyl maleate | 90 | 0.94 | 16 | 1230 |
| 22 | Diallyl ether | 240 | 0.90 | 26 | 2140 |
| 23 | Octadecane divinyl ether | 240 | 0.92 | 32 | 3080 |
| 24 | Triallyl trimellitate | 90 | 0.99 | 62 | 1280 |
| 25 | Trimethylolpropane trimethacrylate | 150 | 0.93 | 28 | 2270 |

| Vinyl chloride plastisol | | Physical property of end product | | | |
|---|---|---|---|---|---|
| Viscosity 2 hours after preparation (poise) | Viscosity 7 days after preparation (poise) | Heat distortion resistance (cigarette resistance) | Abrasion resistance (mg) | Transparency | Edge formability on embossing |
| 30 | 53 | o | 22 | o | o-Δ |
| 31 | 53 | o | 14 | o | o |
| 27 | 48 | o | 11 | o | o |
| 25 | 45 | o | 13 | o | o |
| 27 | 51 | o | 13 | o | o |

Table 5 clearly shows that the vinyl chloride plastisol compositions of the present invention, using a vinyl chloride paste resin containing a specific gel content and a specific particle size, which was produced by copolymerising a vinyl chloride monomer and a polyfunctional monomer of the kind, have excellent viscosity stability and also easily provide end products excellent in heat distortion resistance (cigarette resistance), abrasion resistance, transparency and edge formability on embossing.

What is claimed is:

1. A vinyl chloride plastisol composition comprising 100 parts by weight of a vinyl chloride paste resin and 35 to 180 parts by weight of a plasticizer, said vinyl chloride paste resin having an average particle size of 0.5 to 10 microns, and being composed of 5 to 80% by weight of tetrahydrofuran-insoluble micro-gel fraction and 20 to 95% by weight of tetrahydrofuran-soluble fraction.

2. The composition according to claim 1, wherein said vinyl chloride paste resin contains 8 to 50 wt. % of a tetrahydrofuran-insoluble micro-gel fraction.

3. The composition according to claim 1, wherein the tetrahydrofuran-soluble fraction in the vinyl chloride paste resin has an average degree of polymerization of more than 800.

4. The composition according to claim 3, wherein the tetrahydrofuran-soluble fraction in the vinyl chloride paste resin has an average degree of polymerization of more than 1100.

5. The composition according to claim 1, wherein said vinyl chloride paste resin is one produced by emulsion polymerization or micro-suspension polymerization, in the presence of a polyfunctional monomer having two or more ethylenic double bonds, of vinyl chloride or a mixture of a major amount of vinyl chloride and a minor amount of a monomer copolymeriable therewith.

6. The composition according to claim 1, wherein said vinyl chloride paste resin is a mixture of (A) a vinyl chloride resin containing tetrahydrofuran-insoluble micro-gel fraction produced by emulsion polymerization, in the presence of a polyfunctional monomer having two or more ethylenic double bonds, of vinyl chloride or a mixture of vinyl chloride and a monomer copolymerizable therewith and (B) a vinyl chloride resin containing no tetrahydrofuran-insoluble micro-gel fraction.

7. The composition according to claim 1, 2, 3, 4, 5 or 6, wherein the amount of plasticizer is 50 to 100 parts by weight.

* * * * *